US008843086B2

(12) United States Patent
Wandel et al.

(10) Patent No.: US 8,843,086 B2
(45) Date of Patent: Sep. 23, 2014

(54) METHOD AND APPARATUS FOR ENABLING TRANSMISSION IN A SLOTTED RADIO DATA COMMUNICATION SYSTEM BY PAUSING DATA RECEPTION

(75) Inventors: Matthias Wandel, Waterloo (CA); Mark Pecen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1074 days.

(21) Appl. No.: 11/344,524

(22) Filed: Jan. 31, 2006

(65) Prior Publication Data

US 2007/0177537 A1  Aug. 2, 2007

(51) Int. Cl.
*H04B 1/44* (2006.01)
*H04B 7/212* (2006.01)
*H04L 1/18* (2006.01)
*H04L 1/16* (2006.01)

(52) U.S. Cl.
CPC ............ *H04L 1/1685* (2013.01); *H04L 1/1854* (2013.01)
USPC ................ 455/83; 370/337; 370/347; 455/78

(58) Field of Classification Search
USPC .................. 455/70, 78, 83, 88; 370/337, 347
See application file for complete search history.

(56) References Cited

U.S. PATENT DOCUMENTS

| 4,646,082 | A | | 2/1987 | Engel et al. | |
|---|---|---|---|---|---|
| 5,227,775 | A | * | 7/1993 | Bruckert et al. | 340/825.25 |
| 6,016,311 | A | * | 1/2000 | Gilbert et al. | 370/280 |
| 6,788,924 | B1 | * | 9/2004 | Knutson et al. | 455/265 |
| RE43,107 | E | * | 1/2012 | Dupuy | 370/337 |
| 2004/0137931 | A1 | * | 7/2004 | Sarkar et al. | 455/522 |
| 2004/0151143 | A1 | * | 8/2004 | Abdesselem et al. | 370/336 |
| 2006/0068820 | A1 | | 3/2006 | Sugaya et al. | |
| 2006/0250957 | A1 | * | 11/2006 | Gielty et al. | 370/230 |
| 2007/0009022 | A1 | * | 1/2007 | Chen | 375/229 |

FOREIGN PATENT DOCUMENTS

| EP | 0905923 A2 | 3/1999 |
|---|---|---|
| JP | 2005124159 | 5/2005 |
| JP | 2006025463 | 1/2006 |
| JP | 2007336284 | 12/2007 |
| JP | 2011113044 | 6/2011 |
| KR | 1020030024380 A | 3/2003 |
| WO | 2005011163 | 2/2005 |

OTHER PUBLICATIONS

Szu-Lin Su et al, "Performance Comparison of Acknowledgement Protocols for Multihop Code Division Multiple Access Networks," Integrating the World Through Communications. Toronto, Jun. 22-25, 1986, International Conference on Communications, New York, IEEE, US, vol. 3, Jun. 1986, pp. 1833-1838. [XP-000809670].

(Continued)

Primary Examiner — Wesley Kim
(74) Attorney, Agent, or Firm — Hanley, Flight & Zimmerman, LLC

(57) ABSTRACT

Apparatus, and an associated method, that facilitates communication of data in a radio communication system that utilizes a slotted communication scheme. Multiple successive time slots are allocable upon which to communicate data to a receiving communication station. At selected intervals, a controller causes the mode of operation of the receiving communication station to be changed to pause operation in a receive mode and, during the pause, to cause operation of the receiving communication station to transmit data, such as control acknowledgments or other responses.

18 Claims, 2 Drawing Sheets

(56) References Cited

OTHER PUBLICATIONS

IP Australia, "Examiner's Report" issued in connection with corresponding Australian Patent Application No. 2007200288, dated Jun. 24, 2008 (2 pages).
IP Australia, "Notice of Acceptance", issued in connection with corresponding Australian Patent Application No. 2007200288, dated Feb. 19, 2009 (3 pages).
Canadian Intellecutal Property Office, "Notice of Allowance", issued in connection with corresponding Canadian Patent Application No. 2,728,512, dated Mar. 19, 2014 (1 page).
Canadian Intellecutal Property Office, "Office Action", issued in connection with corresponding Canadian Patent Application No. 2,728,512, dated Apr. 26, 2013 (3 pages).
Canadian Intellecutal Property Office, "Notice of Allowance", issued in connection with corresponding Canadian Patent Application No. 2,575,231, dated Sep. 3, 2010 (1 page).
State Intellectual Property Office of People's Republic of China, "Office Action", issued in connection with corresponding Chinese Patent Application No. 200710007701.8, dated Aug. 21, 2009 (12 pages).
State Intellectual Property Office of People's Republic of China, "Notice of Allowance ", issued in connection with corresponding Chinese Patent Application No. 200710007701.8, dated Feb. 12, 2010 (4 pages).
European Patent Office, "European Search Report", issued in connection with corresponding European Patent Application No. 06250518.5, dated May 16, 2006 (3 pages).
European Patent Office, "Examination Report", issued in connection with corresponding European Patent Application No. 06250518.5, dated Jun. 23, 2006 (5 pages).
European Patent Office, "Examination Report", issued in connection with corresponding European Patent Application No. 06250518.5, dated Nov. 16, 2007 (5 pages).
Japanese Intellectual Property Office, "Notice of Reasons for Rejection", issued in connection with corresponding Japanese Patent Application No. 2007-013598, dated Jul. 7, 2009 (5 pages).
Korean Intellectual Property Office, "Notice of Allowance", issued in connection with corresponding Korean Patent Application No. 10-2007-0009895, dated Apr. 27, 2009 (3 pages).
Korean Intellectual Property Office, "Office Action", issued in connection with corresponding Korean Patent Application No. 10-2007-0009895, dated Apr. 22, 2008 (5 pages).
Korean Intellectual Property Office, "Office Action", issued in connection with corresponding Korean Patent Application No. 10-2007-0009895, dated Oct. 27, 2008 (6 pages).
European Patent Office, "Decision to Grant", issued in connection with corresponding European Patent Application No. 06250518.5, dated Sep. 4, 2008 (1 page).

* cited by examiner

METHOD AND APPARATUS FOR ENABLING TRANSMISSION IN A SLOTTED RADIO DATA COMMUNICATION SYSTEM BY PAUSING DATA RECEPTION

The present invention relates generally to a manner by which to communicate communication responses, such as control acknowledgments or traffic data, in a slotted communication scheme, such as a GSM cellular communication system that provides for GPRS or EDGE data services. More particularly, the present invention relates to apparatus, and an associated method, for a mobile, or other, communication station that permits the communication station to transmit control acknowledgments, or other data transmissions, while also engaging in reception of data during multiple successive time slots.

BACKGROUND OF THE INVENTION

Advancements in communication technologies have permitted the construction of radio communication systems that provide for data communication services that require for their performance the ability to communicate large amounts of data in short periods of time. The throughput capacity of a communication system quantifies the rate at which data can be communicated between a set of communication stations. Generally, at higher data throughput rates, a communication service that requires communication of data of a given data size can be completed more quickly than when the data is communicated at a lower throughput rate.

A cellular communication system is exemplary of a radio communication system that increasingly is used by which to perform data communication services. While early-generation cellular communication systems were primarily used for voice communication services, successor-generation, cellular communication systems have provided for successively greater data services. A GSM (Global System for Mobile communications) cellular communication system, operable in conformity with the protocols and specifications of a series of operating standards promulgated by the EIA/TIA, is exemplary of a cellular communication system that provides for data communication services. Network infrastructures of GSM cellular communication systems have been widely deployed, permitting large numbers of users to communicate by way of a GSM network. Some GSM systems provide for GPRS (General Packet Radio Service), a high-speed data communication service. A super set of GPRS, referred to as EDGE (Enhanced Data for GSM Evolution), also defines a high-speed data communication service. EDGE communications, in general, add eight-PSK modulation, incremental redundancy, and adaptive modulation and coding to GPRS communications. An EDGE-capable communication system, as a result, provides for achievable data throughput rates that are significantly higher than those achievable in a GPRS-only system. GPRS and EDGE data communications provide efficient usage of radio and network resources to effectuate data communication services that are packet based, intermittent and non-periodic, and either frequent, with small transfers of data, or infrequent, with large transfers of data. Internet browsing and electronic mail messaging are two exemplary communication services carried out by way of a GSM/GPRS/EDGE network. Other digital cellular communication systems analogously also provide for data communication services.

The operating protocols set forth in the standard promulgations relating to GSM/GPRS/EDGE communications define various requirements with respect to the communication stations between which the data is communicated. For instance, specification number TS 45.008[5] sets forth adjacent-cell measurement requirements. And, document TS 45.0002[2], Annex B, sets forth required communication-station reaction times. Multi-slot classes are also defined in the standard promulgation.

A possible multi-slot communication allocation provides for the possibility of communication allocations. That is to say, allocations can be made over a plurality of time slots, even the entirety of the time slots of one or more frames. While permitted, this multi-slot communication possibility is precluded in actual practice. Reporting and acknowledgment requirements, set forth in the aforementioned operating protocols, necessitate that a receiving communication station be able to generate and send acknowledgments or reports during one or more time slots of a frame or group of frames. The need to provide for a time slot for reporting or acknowledgment messages, if only during a single time slot of a group of frames, prevents an allocation of all of the time slots for the data communications.

If a manner could be provided by which to permit the multi-slot communication allocations while still providing a mechanism for a communication station to return communication acknowledgments or reports, improved communication performance in a time-slotted communication system would be provided.

It is in light of this background information related to communications in a slotted radio data communication system that the significant improvements of the present invention have evolved.

DETAILED DESCRIPTION

Figure 1:
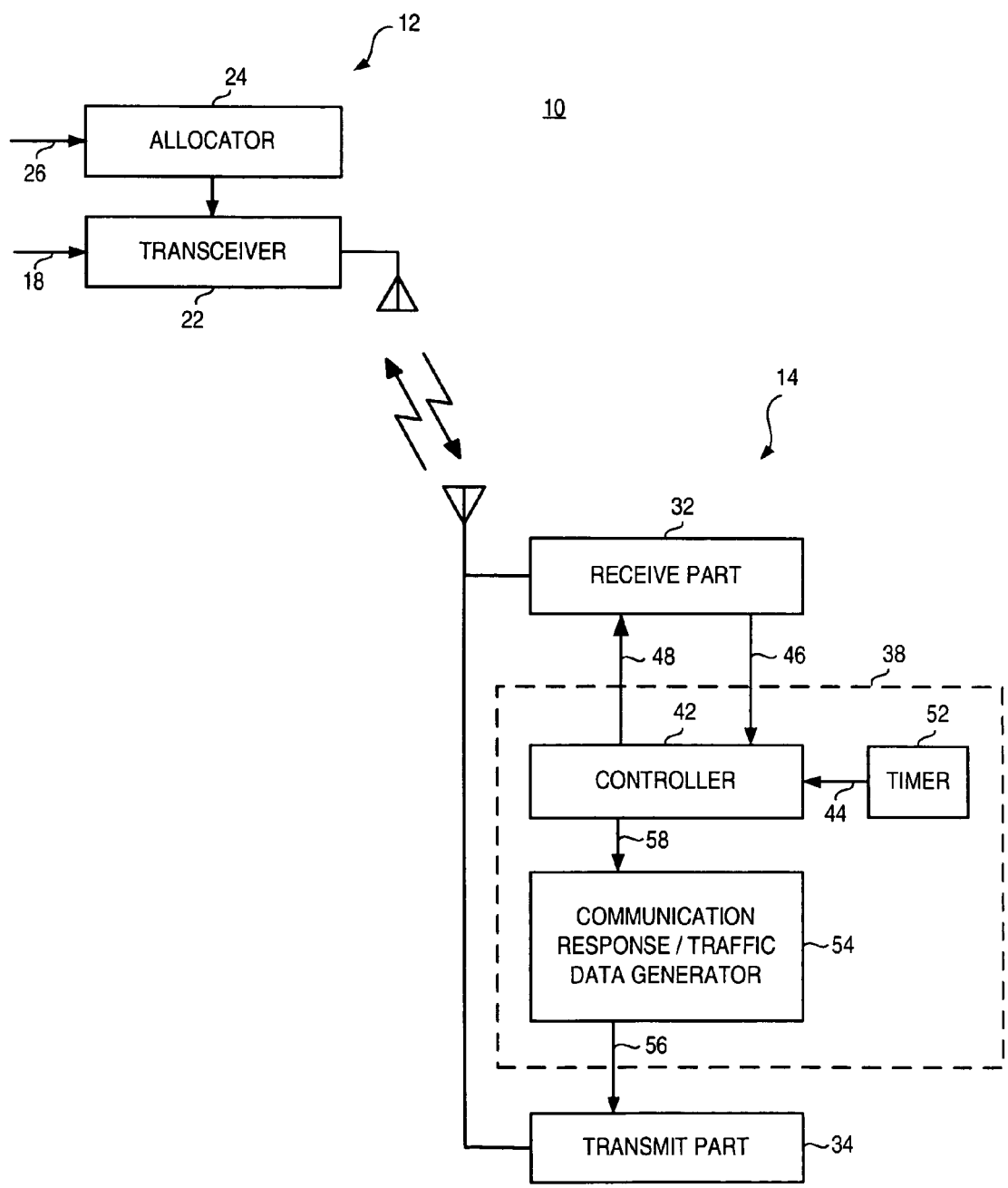
FIG. 1 illustrates a functional block diagram of a communication system in which an embodiment of the present invention is operable.

The present invention, accordingly, advantageously provides apparatus, and an associated method, by which to communicate communication responses, such as communication acknowledgments or traffic data, in a slotted communication scheme, such as a GSM communication scheme that provides for GPRS or EDGE data services.

Through operation of an embodiment of the present invention, a manner is provided for a mobile, or other, communication station that permits the communication station to transmit control acknowledgments, or other data transmissions, while also engaging in reception of data during multiple successive time slots.

Communication reception is intermittently paused while the communication station transmits the control acknowledgment or other data. The pause in the reception is great enough at least to permit the communication station to change its operational mode to permit the transmission of the acknowledgment or other data, to perform the transmission, and to return operation to a mode to continue receiving the communication data.

Autonomous selection by the communication station is made to send the control acknowledgment or other data, and, responsive to such decision, a receive part is turned off, or its operation otherwise paused, while preparations are made to transmit the control acknowledgment or other data, on a selected one or more time slots.

By providing the capability to the communication station, the communication station is permitted to be operable in additional multi-slot combinations of communication allocations, particularly, allocations in which entire frames, viz., all of the time slots of one or more frames, are allocated for communication of data to a communication station.

When implemented in a mobile station, implicit support for control acknowledgment transmissions on a communication uplink on one or more time slots at selected intervals, such as a time slot selected during every certain number of downlink allocated blocks, is provided. The mobile station observes conformance to reaction time requirements to change the mode of the mobile station to permit its communication of the control acknowledgment or other data transmission at selected intervals while otherwise operating to receive downlink data communicated to the mobile station during multiple successive time slots encompassing entire time frames.

In another aspect of the present invention, the other data transmission comprises an uplink TBF (Temporary Block Flow). The uplink TBF is provided while a multiple successive downlink time slot allocation is active. During a period in which the mobile station is to send data, the mobile station reduces its downlink allocation to accommodate the uplink data transmission. When the uplink transmission is completed, the mobile station reverts its operation again to receive downlink data during all of the time slots of the multiple successive time slots.

When implemented in a GSM system that provides for GPRS, or its superset EDGE, data communication services, communication is provided with one or more mobile stations. Pursuant to registration of a mobile station, the mobile station informs the network part of the communication system of the capability of the mobile station to operate in an implicit mode, that is, a mode in which the mobile station pauses its reception operations at selected intervals and for selected time periods at the selected intervals, sends control acknowledgments, or other data, to the network part. The mobile station informs the network part of its capabilities, for instance, in a Classmark message. The message includes a field, or fields, to inform the network part of the capabilities of the mobile station to operate in this mode.

In response to registration and election to perform a communication service, the mobile station is allocated a specific set of radio resources for the reception of downlink information sent to the mobile station by the network part of the communication system. The downlink radio resources that are assigned to the mobile station include a radio frequency and an integral number of time slots, viz., a number of multiple successive time slots. The mobile station receives and decodes information communicated and received on all of the allocated downlink time slots during a portion of the reception of the downlink data traffic. The mobile station switches to a mode in which the mobile station receives and decodes the information on only a subset of the downlink time slots and during another subset of the period, the mobile station operates to transmit a control acknowledgment or other data traffic on an uplink to the network part of the communication system. Switching between the modes of operation by the mobile station is carried out alternately autonomously or in response to a message sent by the network, such as an uplink state flag.

Thereby, the mobile station is able to be operated to receive data allocated during multiple successive time slots, such as all of the time slots of a set of time frames while also permitting the mobile station to provide control acknowledgments or send other data to the network.

In these and other aspects, therefore, apparatus, and an associated method, is provided for facilitating communication response by a first communication station that receives communication data communicated upon time slots defined pursuant to a time-slotted communication scheme. A controller is adapted to receive an indication of when the communication response is to be sent by the first communication station. The controller is configured selectably to generate a receive pause control signal used to pause receive operation of the communication station during at least a first selected time slot period. A communication response generator is configured to generate the communication response, available for communication by the first communication station during the at least the first selected time slot period identified in the receive pause control signal generated by the controller.

With these and other aspects in mind, therefore, reference is first made to FIG. 1. A communication system, shown generally at 10, provides for the communication of data between communication stations by way of a radio air interface. The communication of the data is carried out pursuant to operation of an embodiment of the present invention. In the exemplary implementation, the communication system 10 operates in general conformity with the operating protocols of a GSM/GPRS/EDGE (Global System for Mobile communications/General Packet Radio Service/Enhanced Data for GSM Evolution) communication system as set forth in the operating standards relating thereto promulgated by the EIA/TIA. While the following description shall describe exemplary operation of the communication system with respect to its exemplary implementation in which GPRS or EDGE data services are provided, the teachings of the present invention are analogously also applicable to other types of communication systems, e.g., other communication systems that make use of a slotted communication scheme.

Elements of the communication system 10 shown in FIG. 1 include a set of communication stations, here communication stations 12 and 14. The communication station 12 is representative of a network station forming part of the network infrastructure of the communication system. And, the communication station 14 is representative of a mobile station. The communication stations 12 and 14 shall, at times, be referred to herein as a network station and a mobile station, respectively. During operation of the communication system, data is communicated, such as pursuant to performance of a data communication service, between the network and mobile stations. Downlink communication of data, i.e., by the network station to the mobile station, as well as uplink communication of data, i.e., by the mobile station to the network station is carried out. For purposes of illustration, a downlink data communication service shall be described. An uplink communication service is analogous, and its performance is analogously carried out.

The network station is adapted to receive data, here represented by way of the line 18, that is to be communicated to the mobile station. The data provided by way of the line 18 is provided to a transmit part of a transceiver 22. The transmit part of the transceiver operates to place the data in a form to permit its communication to the mobile station and to transmit the data, once placed in the appropriate form.

The mobile station registers with the network station pursuant to registration procedures. Registration procedures are carried out, for instance, when the mobile station is powered-up and when the mobile station enters into an area encompassed by a network part of which the network station forms a portion. As part of the registration procedure, the mobile station sends a Classmark 2 or 3 message. The Classmark message is defined in the operating specification of the GSM/GPRS/EDGE, and pursuant to an embodiment of the present invention includes an extension that identifies the mobile station capability to send communication acknowledgments, or other data, at selected intervals and periods. The transceiver of the network station also includes a receive part that receives messages sent by the mobile station.

The network station also includes an allocator 24. The allocator allocates radio resources upon the radio air interface that extends between the network and mobile stations. The allocation is, in the exemplary implementation, made responsive to indications, here provided by way of the line 26, of the amount of data that is to be communicated. Other, or additional, indicia is alternately utilized by the allocator in the allocation of radio resources to provide for the communication of the data. The radio air interface of a GSM/GPRS/EDGE communication system forms a time-slotted communication scheme in which time frames are defined at various frequencies within the range of operation of the communication stations. Each time frame is divided into time slots, and time slot-radio frequency carrier combinations are allocable for the communication of the data. As mentioned previously, multiple sequential time slots are allocable upon a carrier to expedite the communication of data between the communication stations. While allocation of time slots that encompass an entire time frame, or groups of time frames, is permitted, the need to provide opportunity to a communication station, here the mobile station, that receives the data to acknowledge its receipt or otherwise respond, at selected intervals to the communication station that communicates the data, limits the multiple successive time slot allocations. A time period great enough to permit the communication of the communication acknowledgment and other response as well as time periods to change the mode of operation of the mobile station into and out of the acknowledgment or response node is required. As a result, existing allocations made by conventional allocators 24 do not allocate the multiple successive time slots of a number that would prevent the generation and return of the communication acknowledgment or other response. Pursuant to an embodiment of the present invention, more expansive, multiple successive time slot allocations are permitted to be made when the mobile station is identified to be capable of implicit mode operation, thereby to facilitate timely communication of data to perform a data communication service.

Allocations made by the allocator are provided to the transceiver, and the operations of the transceiver to transmit the data provided by way of the line 18 for communication to the mobile station is carried out using the resources allocated by the allocator.

The mobile station 14 also includes a transceiver, here represented by a receive part 32 and a transmit part 34. The receive part operates to receive the data communicated thereto and perform conventional receive operations upon the received data to recreate the informational content thereof.

The mobile station also includes apparatus, shown generally at 38, of an embodiment of the present invention. The apparatus 38 is functionally represented, implementable in any desired manner, including, for instance, by algorithms executable by processing circuitry. The apparatus 38 facilitates operation of the mobile station to transmit control acknowledgments, or other communication responses, while engaging in a downlink data transfer of GPRS or EDGE-formatted data pursuant to a data communication service. By its operation, the apparatus 38 permits operation of the communication system to communicate data upon multiple successive time slots, including the time slots of entire time frames, thereby to most expeditiously perform a data communication service. The apparatus 38 also operates, during mobile-station registration, to form the Classmark 2 or 3 message that informs the network station of mobile-station capability in an implicit mode.

The apparatus 38 includes a controller 42 that is provided with input indicia on the lines 44 and 46 and, responsive to the indicia, selectably generates a pause control signal on the line 48 for application to the receive part 32. The indicia provided on the line 44 is here provided by a timer 52. The timer is synchronized to the timing scheme of the communication system and provides an indication to the controller by way of the line 44 at selected intervals to indicate that a control acknowledgment or other communication response is to be generated and communicated by the mobile station pursuant to the performance of the data communication service. The indicia provided to the controller by way of the line 46 is here representative of indicia identifying when communication data communicated pursuant to the data communication service is received at the receive part, at least to indicate when the communication data is received during at least a selected number of sequential time slots. The pause control signal caused by the controller to be applied to the receive part 32 pauses operation of the receive part to pause its operation to receive data for a selected period, such as a time slot or group of time slots. The pausing of reception, and transmission by the mobile station, and corresponding operation of the network station to not transmit data is carried out implicitly without need for additional signaling subsequent to registration and transmission of the Classmark 2 or 3 message by the mobile station.

The apparatus further includes a communication response and traffic data generator 54 that is selectably operable to generate a communication acknowledgment or response or traffic data that is provided by way of the line 56 to the transmit part 34 for transmission therefrom. In the exemplary implementation, the operation of the generator 54 is in synchronicity with the generation by the controller of the pause control signal, either in a concurrent or timed relationship. Synchronicity is here represented by the line 58 that extends between the controller 42 and the generator 54. And, the receive and transmit parts are synchronized such that the pause control signal causes pausing of the operation of the receive part for a time period that corresponds with the time period during which the transmit part operates to transmit the communication acknowledgment, response, or traffic data. As reaction time periods, such as those set forth in the GPRS-EDGE specification TS 45.0002[2], Annex B, are also taken into account, the time period during which the receive part is not operated to receive and operation upon received data is correspondingly lengthened.

As the operation of the receive part of the mobile station is caused to be paused and the transmit part of the mobile station is caused to transmit during selected periods, such as during a single time slot of a group of time frames, multiple sequential time slot allocations for communication of data to the mobile station can be made, and communication data communicated pursuant to the performance of the data communication service while also providing a mechanism by which to generate communication acknowledgments or responses or to generate traffic data, also pursuant to effectuation of the data communication service.

Allocations made by the allocator 24 are made implicitly in conjunction with the operation of the apparatus 38 embodied at the mobile station such that data is not communicated by the network station to the mobile station during the periods in which the operation of the receive part 32 of the mobile station is paused. Data is not sent by the network station when the mobile station is not operated to receive the communicated data, and the network station is alerted to be operable to detect the communication acknowledgment or other response generated and transmitted by the mobile station.

Figure 2:
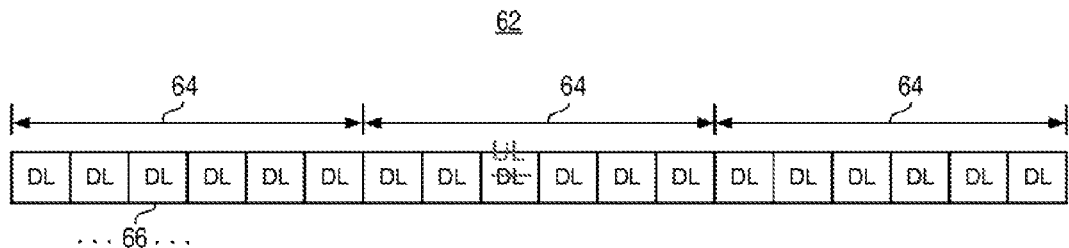
FIG. 2 illustrates a graphical representation of exemplary utilization of the slotted radio air interface pursuant to exemplary operation of an embodiment of the present invention.

FIG. 2 illustrates a representation, shown generally at 62, representative of exemplary communication allocations over a plurality of time slots encompassing a group of frames. Here, three frames 64, each formed of six time slots 66, are shown. Time slots that are allocated for downlink communications are designated with the letters "DL". And, time slots that are used to return communication acknowledgments are designated with the letters "UL". In this exemplary representation, multiple successive time slots are allocated for downlink communications of the data. And, more particularly, multiple sequential time slots encompassing entire time frames 64 are allocated for the downlink communications. Only intermittently, here, during a time slot of one alternating time frame, is there an allocation for return of a communication acknowledgment or other response. Thereby, increased amounts of radio resources are allocable for the communication of the data to the mobile station.

Also pursuant to operation of a further embodiment of the present invention, an uplink state flag (USF) is sent by the network part to the mobile station. When received at the mobile station, the uplink state flag, or its absence, is determinative, at the mobile station, as to whether the mobile station sends data back to the network station on uplink-designated time slots. If the network station elects not to send a USF, the mobile station operates solely in a receive mode to receive downlink data communicated upon the allocated downlink channels. If, conversely, the network station sends an USF to the mobile station, the mobile station is granted the opportunity to transmit data, such as in the next or subsequent block period. And, subsequent to the transmission by the mobile station, in conformity with the instructions of the USF, the mobile station returns to the receive mode to receive downlink communication data during the next subsequent block period.

With respect to the exemplary implementation in a GSM/GPRS/EDGE communication system, an embodiment of the present invention provides the capability of an amended TS[4] 44.060 standard promulgation to permit implicit support for control acknowledgments (Ctl-Ack) on an uplink every certain number of downlink blocks, by reducing the downlink assignment from six or more to a number less than six, thereby enabling a mobile station to observe conformance to reaction time requirements set forth in the existing promulgation of document number TS 45.002[2] whenever the mobile station requires the transmission of an uplink control acknowledgment. For instance, a DL TBF is sent, responsive to assignment, i.e., allocation, of time slots TS0 . . . TS6 for twelve block periods. And, then, for one block period, the DL assignment is temporarily changed to, e.g., TS0 . . . TS3, while the control acknowledgment is sent on the uplink. The assignment, i.e., allocation, thereafter reverts to TS0 . . . TS6 for another twelve block period.

Figure 3:
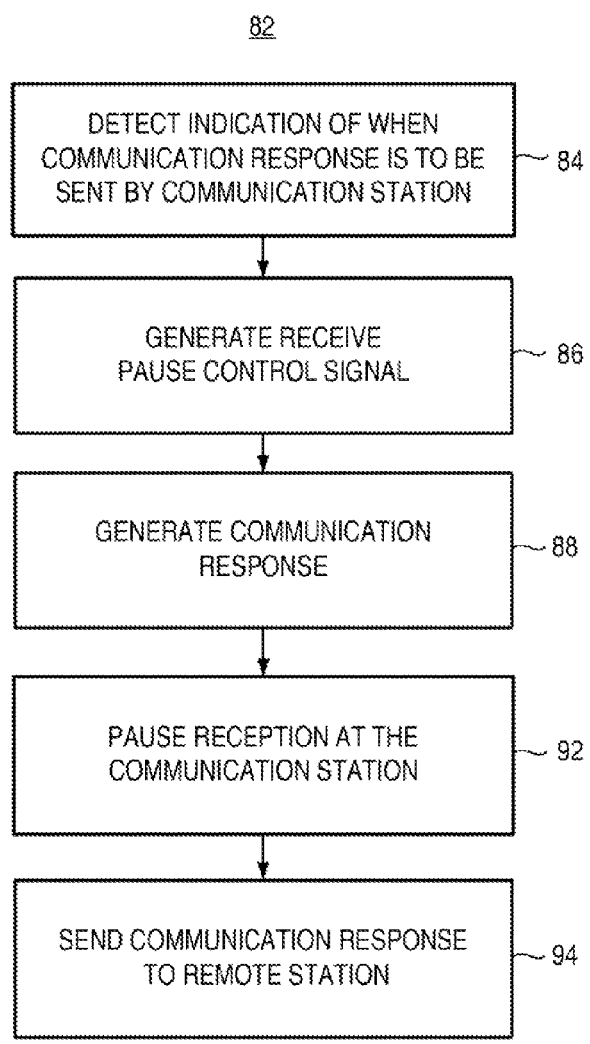
FIG. 3 illustrates a method flow diagram listing the method of operation of an embodiment of the present invention.

FIG. 3 illustrates a method, shown generally at 82, representative of the method of operation of an embodiment of the present invention. The method facilitates communication response by a first communication station that receives communication data communicated upon time slots defined pursuant to a time slotted communication scheme. First, and as indicated by the block 84, an indication of when the communication response is to be sent by the first communication station is detected. In one implementation, additional detections are made, such as detections of an indication of when the communication data received by the first communication station is communicated by more than a selected number of successive time slots.

Then, and as indicated by the block 86, a receive pause control signal is selectably generated. The receive pause control signal is used to pause receive operation of the first communication station during at least a first selected time slot period.

Then, and as indicated by the block 88, a communication response is generated. The communication response is available for communication by the first communication station during the at least the first selected time slot period.

Thereafter, and as indicated by the block 92, reception is paused at the first communication station during the first time slot period identified in the receive pause control signal. And, as indicated by the block 94, the communication response is sent to a remote station.

Thereby, through operation of an embodiment of the present invention, a manner is provided by which to permit multiple successive time slots, such as those encompassing entire time frames, to be made and used upon which to communicate data to perform a data communication service. Receive operations at a receiving station are paused at selected intervals to permit the receiving communication station to generate and transmit communication acknowledgments or other responses.

The previous descriptions are of preferred examples for implementing the invention, and the scope of the invention should not necessarily be limited by this description. The scope of the present invention is defined by the following claims.

What is claimed is:

1. A method for transmitting by a device, the method comprising:
   receiving, from a network, an allocation of a plurality of first timeslots for data reception at the device;
   receiving, from the network, an allocation of one or more second timeslots for data transmission at the device;
   performing data reception on one or more of the allocated first timeslots during first time period, the performing of the data reception precluding transmission on a first one of the one or more allocated second timeslots during the first time period; and
   without further configuration by the network:
      pausing data reception on a first one of the one or more allocated first timeslots during a second time period subsequent to the first time period to permit transmission on the first one of the one or more allocated second timeslots during the second time period; and
      transmitting during the second time period on the first one of the one or more allocated second timeslots.

2. The method of claim 1, further comprising transmitting an indication of transmit and receive capabilities of the device.

3. The method of claim 1, wherein the transmitting comprises sending an acknowledgment of received data on the first one of the one or more allocated second timeslots.

4. The method of claim 1, further comprising monitoring the plurality of first timeslots upon completion of the transmitting during the second time period.

5. The method of claim 1, wherein pausing data reception comprises pausing for a duration great enough to transmit during the first one of the one or more allocated second timeslots and to conform to device reaction time requirements.

6. The method of claim 1, wherein the second time period has a duration sufficient to permit the device to transmit during the first one of the one or more allocated second timeslots and to change into and out of an operational mode to permit said transmitting.

7. The method of claim 1, wherein said transmitting comprises sending traffic data during the first one of the one or more allocated second timeslots.

8. The method of claim 1, wherein transmitting during the first one of the one or more allocated second timeslots is responsive to receiving an uplink state flag.

9. The method of claim 1, further comprising, after the second time period, reverting back to performing data reception on the first one of the one or more allocated first timeslots without further configuration by the network.

10. A device for transmitting information, the device comprising:
a processor configured to:
receive, from a network, an allocation of a plurality of first timeslots for data reception at the device;
receive, from the network, an allocation of one or more second timeslots for data transmission at the device;
perform data reception on one or more of the allocated first timeslots during a first time period, the performing of the data reception precluding transmission on a first one of the one or more allocated second timeslots during the first time period; and
without further configuration by the network:
pause data reception on a first one of the one or more allocated first timeslots to permit transmission on the first one of the one or more allocated second timeslots during the second time period;
transmit during the second time period on the first one of the one or more allocated second timeslots; and
after the second time period, revert back to performing data reception on the first one of the one or more allocated first timeslots.

11. The device of claim 10, wherein the processor is further configured to transmit an indication of transmit and receive capabilities of the device.

12. The device of claim 10, wherein the processor is further configured to send an acknowledgment of reception of received data on the first one of the one or more allocated second timeslots.

13. The device of claim 10, wherein the processor is further configured to resume monitoring of the plurality of first timeslots upon completion of the transmission during the second time period.

14. The device of claim 10, wherein the second time period has a duration sufficient to permit the device to transmit during the first one of the one or more allocated second timeslots and to change into and out of an operational mode to permit said transmitting.

15. The device of claim 10, wherein the processor is configured to select the second time period to transmit during the first one of the one or more allocated second timeslots and to change into and out of an operating mode that permits transmission.

16. The device of claim 10, wherein the processor is configured to pause data reception for a duration great enough to transmit during the first one of the one or more allocated second timeslots and to conform to device reaction time requirements.

17. The device of claim 10, wherein the processor is configured to transmit traffic data during the first one of the one or more allocated second timeslots.

18. The device of claim 10, wherein the processor is configured to transmit during the first one of the one or more allocated second timeslots responsive to receiving an uplink state flag.

* * * * *